United States Patent
Bhatia et al.

(10) Patent No.: US 7,374,818 B2
(45) Date of Patent: May 20, 2008

(54) COATING SYSTEM FOR SILICON BASED SUBSTRATES

(75) Inventors: Tania Bhatia, Middletown, CT (US); Wayde R. Schmidt, Pomfret Center, CT (US); William K. Tredway, Manchester, CT (US); Venkata R. Vedula, Middletown, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 11/135,857

(22) Filed: May 23, 2005

(65) Prior Publication Data

US 2007/0014996 A1 Jan. 18, 2007

(51) Int. Cl.
*B32B 9/04* (2006.01)
*C23C 16/00* (2006.01)

(52) U.S. Cl. ............... 428/446; 428/450; 428/702; 427/249.1; 427/255.11

(58) Field of Classification Search ........... 428/446, 428/450, 697, 699, 701, 702, 304.1
See application file for complete search history.

(56) References Cited

U.S. PATENT DOCUMENTS

| | | | |
|---|---|---|---|
| 4,639,388 A * | 1/1987 | Ainsworth et al. ......... 428/117 |
| 6,299,988 B1 | 10/2001 | Wang et al. | |
| 6,485,848 B1 | 11/2002 | Wang et al. | |
| 6,517,960 B1 | 2/2003 | Wang | |
| 6,759,151 B1 * | 7/2004 | Lee ......................... 428/701 |
| 2003/0138641 A1 | 7/2003 | Fukudome et al. | |

FOREIGN PATENT DOCUMENTS

| | | |
|---|---|---|
| EP | 0 310 043 | 4/1989 |
| EP | 1 044 943 | 10/2000 |
| EP | 1 044 944 | 10/2000 |
| EP | 1 044 946 | 10/2000 |
| EP | 1 044 947 | 10/2000 |
| EP | 1 479 656 | 11/2004 |
| EP | 1 479 657 | 11/2004 |
| EP | 1 479 658 | 11/2004 |
| EP | 1 479 659 | 11/2004 |

\* cited by examiner

*Primary Examiner*—Jennifer McNeil
*Assistant Examiner*—Timothy M Speer
(74) *Attorney, Agent, or Firm*—Bachman & LaPointe, P.C.

(57) ABSTRACT

A bond coat system for silicon based substrates wherein a compliant layer having an elastic modulus of between 30 and 130 GPa is provided between the silicon based substrate and a silicon metal containing oxygen gettering layer.

16 Claims, 3 Drawing Sheets

COATING SYSTEM FOR SILICON BASED SUBSTRATES

U.S. GOVERNMENT RIGHTS

The invention was made with U.S. Government support under contract N-00014-03-C-0477 awarded by the Department of the United States Navy. The U.S. Government may have certain rights in the invention.

BACKGROUND OF THE INVENTION

The present invention drawn to a bond coat system to be applied to a silicon containing substrate.

Silicon-based monolithic ceramics such as, silicon carbide and silicon nitride, and composites such as, silicon carbide fiber reinforced silicon carbide matrix are attractive materials for use in gas turbine engine hot sections due to their high temperature mechanical and physical properties as well as lower density than metals. However, these materials exhibit accelerated oxidation and recession in high temperature, aqueous environments such as, for example, the combustor and turbine sections of gas turbine engines. In order to reduce the rate of oxidation and recession at high temperatures in substrates used as ceramic components in such environments, significant effort has been given to providing barrier layers for the protection of the silicon based substrates so as to increase the service life of such components.

One variant of a protected coated ceramic article that constitutes prior art is shown in FIG. 1a. A composite article 10 comprises a silicon based substrate 12, a bond coat or layer 14 which comprises a dense continuous layer of silicon metal, and an environmental barrier coating comprising a barrier layer 16 which comprises either an alkaline earth aluminosilicate based on barium and/or strontium; or yttrium silicate. Another refractory top layer 18, such as, for example, aluminum oxide; or zirconium oxide; or yttrium oxide; or combinations thereof may be used on top of the barrier layer 16. Another embodiment of the prior art is shown in FIG. 1b where intermediate layers 20 and 22 are included for lending compliance and/or chemical compatibility to the coating system. The intermediate layer comprises, for example, a mixture of the barrier layer material with an additional oxide such as mullite. These prior art coating systems have proved to be quite adherent and protective and have been used to prevent recession and oxidation of the silicon based substrate 12. However, it has now been found that when the coatings depicted in the prior art are applied to some silicon-containing substrates such as silicon nitride, their mechanical properties suffer as demonstrated by a reduction in the flexure or tensile strength. It is believed that a loss in mechanical properties results from mechanical incompatibilities between the bond coat 14 and silicon-containing substrate 12. It has been found that a mismatch in elastic modulus and thermal expansion coefficients between bond coat 14 and the silicon-containing substrate 12 results in thermal strains in the bond coat 14 and silicon-containing substrate 12 when the coated system 10 is subject to thermal excursions such as cooling from the annealing temperature and/or heating and cooling cycles during gas turbine engine operation. It has also been found that the stored elastic strain energy required for crack propagation would be high in such systems. It is further found that failure in coating systems and brittle ceramics can occur due to high strains and stresses and/or high elastic stored energy in the system. Due to the brittle nature of silicon bond coat and silicon-containing substrate, the thermal strains and the resulting thermal stresses can lead to cracking in the bond layer or substrate or cause delamination of the interface between the bond coat and substrate. High thermal stresses may also lead to local stress concentrations and activate small defects or flaws in the bond coat or silicon-containing substrate leading to a failure well below the typical substrate strength.

Based upon the foregoing, it is clear that the need remains for an improved bond coat system for silicon based ceramic substrates that does not adversely affect the mechanical behavior of the substrate such as reduction in the flexure or tensile strength. It is therefore the primary object of the present invention to provide such a coating system architecture.

Accordingly, it is a principal object of the present invention to provide a bond coat system which does not adversely affect the mechanical properties of silicon based substrates such as silicon nitride. The bond coat system of the invention incorporates the advantages offered by a silicon metal containing bond coat and barrier coating applied thereto while at the same time overcoming the disadvantages noted above.

SUMMARY OF THE INVENTION

The foregoing object is achieved by the present invention wherein a compliant layer having an elastic modulus of between 30 and 130 GPa is provided between a silicon based substrate and an oxygen gettering layer. In the present invention, reduction in substrate strength is mitigated by making the coating system more flaw tolerant by supplying a compliant layer between the oxygen gettering layer and the substrate. The coating system thus retains the advantages of the prior art systems without debiting the strength of the substrate. The mitigation of the strength debit is brought about by the coating design of the present invention, which comprises a compliant layer, oxygen gettering layer, and additional barrier layer(s), which drives down the residual tensile stresses in the layers adjacent to the substrate and/or reduces the stored elastic strain energy of the coated system. Further, the compliant layer acts to buffer the stress concentration in the substrate thereby helping to retain the strength of the substrate. The bond coat system of the present invention is a significant improvement over prior art systems known to date.

Further objects and advantages will appear hereinbelow.

DETAILED DESCRIPTION

Figure 1A:
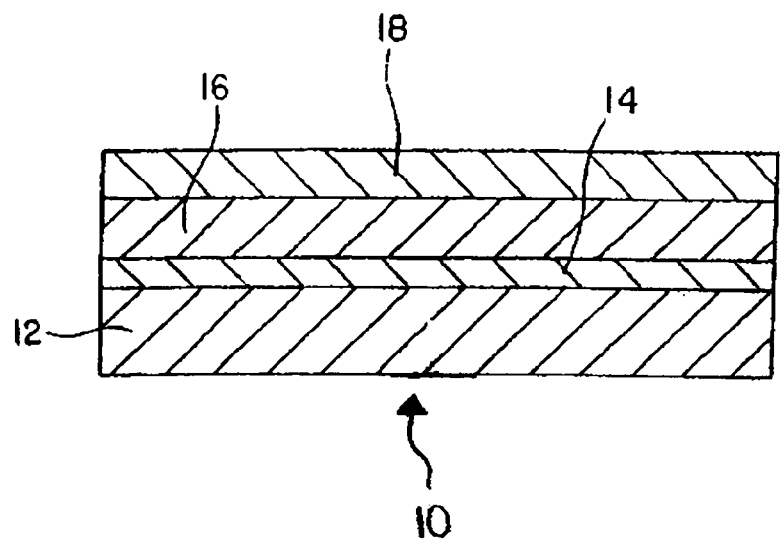
FIGS. 1a and 1b are schematic illustrations of composite articles in accordance with the prior art.
Figure 1B:
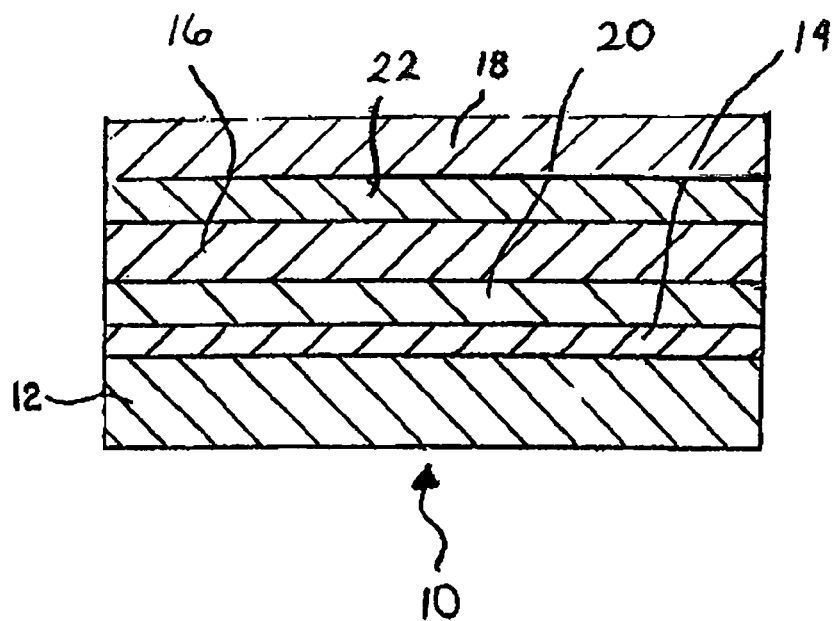
Figure 2:
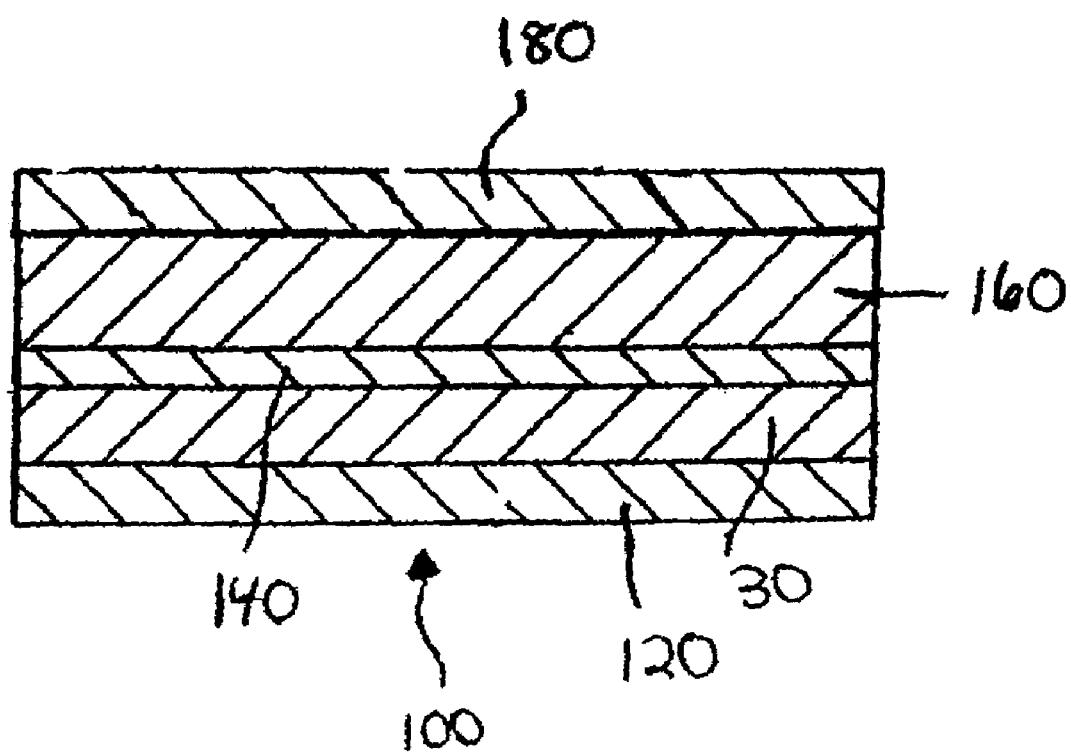
FIG. 2 is a schematic illustration of the composite article in accordance with one embodiment of the present invention.

With reference to FIG. 2, the composite article 100 of the present invention is illustrated and comprises a silicon based substrate 120, an oxygen gettering layer 140 and a compliant layer 30 between the silicon based substrate and the silicon metal containing oxygen gettering layer. It should be noted here that the bond coat materials in the prior art are mostly oxygen gettering agents such as Silicon (Si) and refractory metal suicides and combinations thereof. While a Silicon containing oxygen gettering layer 140, is a preferred embodiment of this invention, alternatively, layer 140 could also be high temperature metallic alloys that are alumina or chromia formers as known in the art.

In accordance with the present invention, the compliant layer 30, is selected from the group consisting of alkaline earth alumino silicates, yttrium monosilicate, yttrium disilicate, rare earth mono and disilicates, hafnium silicate, zirconium silicate; oxides of hafnium, zirconium, yttrium, rare earth metals, niobium, titanium, tantalum, silicon, aluminum; silicon nitride; silicon carbide; silicon oxynitrides; silicon oxy carbides; silicon oxycarbonitrides; silicon refractory metal oxides; alumina forming refractory metal alloys; chromia forming refractory metal alloys, and mixtures thereof. It is preferred that the composition of the compliant layer be selected from the group consisting of yttrium oxide, hafnium oxide, rare earth metal oxides, yttrium monosilicate, yttrium disilicate, rare earth mono and disilicates, hafnium silicate, and mixtures thereof. The preferred elastic modulus of the compliant layer is 30-130 GPa. The porosity of the compliant layer must be controlled in order to ensure the desired behavior characteristics noted above. It is preferred that the compliant layer have a porosity of about 2 to 50%, and more preferably about 5 to 25%. Porosity refers to the fraction of voids in the compliant layer 30. The thickness of the compliant layer is preferred to be between 20 and 250 microns and more preferably between 40 and 125 microns. The ratio of thickness of the compliant layer to the oxygen gettering layer is preferred to be between 0.1:1 and 10:1. The compliant layer 30 may comprise a plurality of layers having the composition of the materials set forth above. The compliant layer 30 and gettering layer 140 may be repeated one or more times in the environmental barrier coating system if desired.

The silicon based substrate 120 includes materials selected from the group consisting of monolithic silicon nitride, monolithic silicon carbide, silicon nitride containing composites, silicon carbide containing composites, silicon oxynitrides, silicon oxycarbides, silicon carbonitrides, molybdenum alloys containing silicon, niobium alloys containing silicon.

The article of the present invention includes further environmental barrier layers 160 and 180 applied on to the bond coat system. The barrier layers provide protection against high velocity steam at high temperatures and high pressure. The barrier layers may comprise mullite, alkaline earth aluminosilicates including barium strontium aluminosilicate (BSAS) and strontium aluminosilicate (SAS), yttrium silicates, rare earth silicates, hafnium or zirconium silicate, oxides of hafnium, zirconium, titanium, silicon, yttrium, rare earth metals, tantalum, niobium, aluminum and mixtures thereof.

The layers described above may be applied by any processing methods known in prior art which include, thermal spraying, chemical vapor deposition, physical vapor deposition, electrophoretic deposition, electrostatic deposition, preceramic polymer pyrolysis, sol-gel, slurry coating, dipping, air-brushing, sputtering, slurry painting or any combination thereof. In order to obtain the desired porosity in the compliant layer, sacrificial pore formers can be used to introduce the porosity into the compliant layer. Sacrificial pore formers are well known in the art and include materials such as polyesters, polystyrene, etc.

Figure 3:
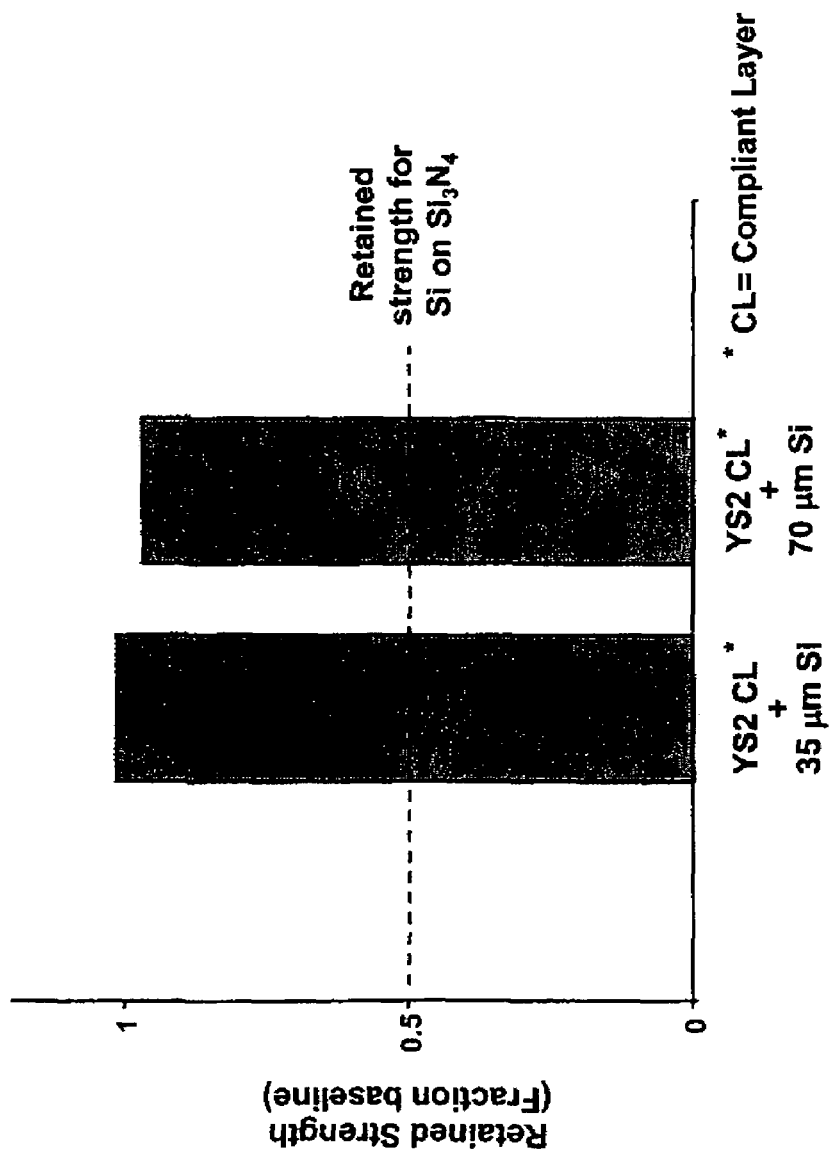
FIG. 3 is a graph showing the advantages of the present invention with respect to retained strength of the coated article.

By employing the bond coat system of the present invention wherein a compliant layer with elastic modulus between 30 and 130 GPa is used in conjunction with an oxygen gettering layer, crack initiation and/or propagation from coating to the substrate or vice-versa is mitigated. This results in the strength retention of coated substrates close to that of baseline substrates, which is critical for structural applications. FIG. 3 shows four-point bending strength of SN282 silicon nitride with the new environmental barrier coating (EBC) bond coat architecture, shown as a fraction of the strength retained compared to the baseline SN282 material (without an EBC). Two different variations of the new bond coat architecture are shown. The range of baseline strength for uncoated SN282 is indicated by the shading. The dashed line shows the typical fraction of retained strength using the prior art EBC architecture, where silicon was applied directly to the silicon nitride substrate. Description of the examples below further demonstrates the advantages of the new EBC architecture.

EXAMPLE 1

26.67 gm of yttrium disilicate ($Y_2Si_2O_7$) was added to 10 ml of deionized water with 2.5% Darvan by weight (2.5 gm Darvan in 100 ml water). The slurry was ball milled for 30 minutes. Six silicon nitride bars were dipped in the slurry and dried. The coated bars were subsequently fired at 1350° C. for 5 hours. The dip process was repeated another time and the bars were refired at 1350° C. for 5 hours. Subsequently, the samples were introduced in a CVD reactor and coated with 35 and 70 microns of silicon. The reactor was maintained at 850-900° C. and the deposition of silicon was carried out as per the following reaction:

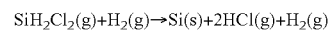

$$SiH_2Cl_2(g)+H_2(g) \rightarrow Si(s)+2HCl(g)+H_2(g)$$

The flexure strength of the coated samples was measured in four-point bending and the average strength was found to be comparable to that of the uncoated silicon nitride samples (FIG. 3). As can be seen from FIG. 3 the high strength of uncoated silicon nitride is maintained even after it is coated.

EXAMPLE 2

31.33 gm of yttrium monosilicate ($Y_2SiO_5$) was added to 10 ml of water with 2.5% Darvan by weight (2.5 gm Darvan in 100 ml water). The slurry was ball milled for 30 minutes. Six silicon nitride bars were dipped in the slurry and dried. The coated bars were subsequently fired at 1350° C. for 5 hours. The dip process was repeated another time and the bars were refired at 1350° C. for 5 hours. Subsequently, the samples were introduced in a CVD reactor and coated with 20 microns of silicon. The reactor was maintained at 850-900° C. and the deposition of silicon was carried out as per the following reaction:

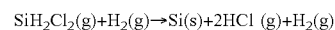

$$SiH_2Cl_2(g)+H_2(g) \rightarrow Si(s)+2HCl\ (g)+H_2(g)$$

The flexure strength of the coated samples was measured in four-point bending and the average strength was found to be 90% of that of uncoated silicon nitride bars.

EXAMPLE 3

Air plasma spray was used to deposit 125 microns of silicon on a silicon nitride substrate. The flexure strength of coated bars was measured in four-point bending and the average strength was found to be approximately 50% of that of uncoated silicon nitride bars.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An article comprising:
   a silicon based substrate;
   an oxygen gettering layer;
   a layer between the silicon based substrate and the oxygen gettering layer, wherein the layer has an elastic modulus of between 30 and 130 GPa and is selected from the group consisting of alkaline earth alumino silicates, yttrium monosilicate, yttrium disilicate, rare earth mono and disilicates, hafnium silicate, zirconium silicate; oxides of hafnium, zirconium, yttrium, rare earth metals, niobium, titanium, tantalum, silicon, aluminum; silicon nitride; silicon carbide; silicon oxynitrides; silicon oxy carbides; silicon oxycarbonitrides; silicon refractory metal oxides; alumina forming refractory metal alloys; chromia forming refractory metal alloys; and mixtures thereof; and
   an environmental barrier coating (EBC) on the oxygen gettering layer.

2. An article according to claim 1, wherein the oxygen gettering layer is selected from the group consisting of silicon metal, silicon metal alloys, intermetallic silicides, chromia forming metallic alloys, alumina forming metallic alloys, and mixtures thereof.

3. An article according to claim 1 or 2, wherein the layer has a porosity of about 2 to 50%.

4. An article according to claim 1 or 2, wherein the layer has a thickness of between 20 and 250 microns.

5. An article according to claim 1 or 2, wherein the layer and the oxygen gettering layer have a ratio of thickness of complaint layer to gettering layer of about 0.1:1 and 10:1.

6. An article according to claim 5, wherein the layer has a thickness of between 40 and 125 microns.

7. An article according to claim 6, wherein the layer has a porosity of about 5 to 25%.

8. An article according to claim 1, wherein the layer is selected from the group consisting of yttrium oxide, hafnium oxide, rare earth metal oxides, yttrium monosilicate, yttrium disilicate, rare earth mono and disilicates, hafnium silicate, and mixtures thereof.

9. An article according to claim 1 or 2, wherein the silicon based substrate is selected from the group consisting of monolithic silicon nitride, monolithic silicon carbide, silicon nitride containing composites, silicon carbide containing composites, silicon oxynitrides, silicon carbonitrides, silicon oxycarbides, molybdenum alloys containing silicon, and niobium alloys containing silicon.

10. An article according to claim 1 or 2, wherein the EBC comprises at least one layer selected from the group consisting of mullite, alkaline earth aluminosilicates, barium strontium aluminosilicate, yttrium silicates, rare earth silicates, hafnium oxide, zirconium oxide, titanium oxide, silicon oxide, yttrium oxide, rare earth metal oxides, tantalum oxide, niobium oxide, aluminum oxide, and mixtures thereof.

11. An article according to claim 10, wherein the EBC comprises a plurality of layers.

12. The article according to claim 1 or 2, wherein the layer and oxygen gettering layer are repeated at least once.

13. The article according to claim 1 or 2, wherein the EBC coating is on substantially all of the oxygen gettering layer.

14. The article according to claim 1 or 2, wherein the coated silicon based substrate, with the oxygen gettering layer and the layer therebetween that retains at least 70% of its original substrate strength.

15. A method of making the article according to claim 1 or 2, wherein at least one of the layer, oxygen gettering layer and the EBC is deposited using thermal spraying, chemical vapor deposition, physical vapor deposition, electrophoretic deposition, electrostatic deposition, preceramic polymer pyrolysis, sol-gel, slurry coating, dipping, air-brushing, sputtering, slurry painting or any combination thereof.

16. A method of making the article according to claim 1, wherein at least one sacrificial pore former is used to control the porosity and thereby modulus of the layer.

* * * * *